United States Patent [19]

Goldstein et al.

[11] 4,161,385

[45] Jul. 17, 1979

[54] EXTRUSION APPARATUS FOR PRODUCING COMPOSITE STRUCTURES

[75] Inventors: Guy Goldstein, Colmar; Yves Roussin-Moynier, Wintzenheim, both of France; Gerd Albrecht, Remscheid, Fed. Rep. of Germany

[73] Assignee: Beghin-Say, Thumeries, France

[21] Appl. No.: 776,433

[22] Filed: Mar. 10, 1977

[30] Foreign Application Priority Data

Mar. 10, 1976 [FR] France ............................. 76 06803

[51] Int. Cl.² ............................................. B29F 3/04
[52] U.S. Cl. ................................. 425/462; 264/241; 425/133.5
[58] Field of Search ............... 264/171, 211, 245, 241; 425/133.5, 462, 380, 376 R

[56] References Cited

U.S. PATENT DOCUMENTS

3,611,492  10/1971  Schiebling ..................... 425/462 X
3,759,647  9/1973  Schrenk et al. ................. 425/462 X

*Primary Examiner*—Roy Lake
*Assistant Examiner*—Mark Rosenbaum
*Attorney, Agent, or Firm*—A. W. Breiner

[57] ABSTRACT

Extrusion-die system comprising an extrusion slit (3) fed upstream by two flows of polymeric materials, one of which issues from one or several flat conduits (7,8), the other from a multitude of small holes (18) drilled into a bar element of generally T-shaped cross-section (5). The cross-section of element (5) has a punch-like configuration with the holes being fashioned therein in two parallel rows and being staggered from one row to the other. The die system permits manufacture of products comprising a network of threads or filaments sheathed in a film or foil.

7 Claims, 6 Drawing Figures

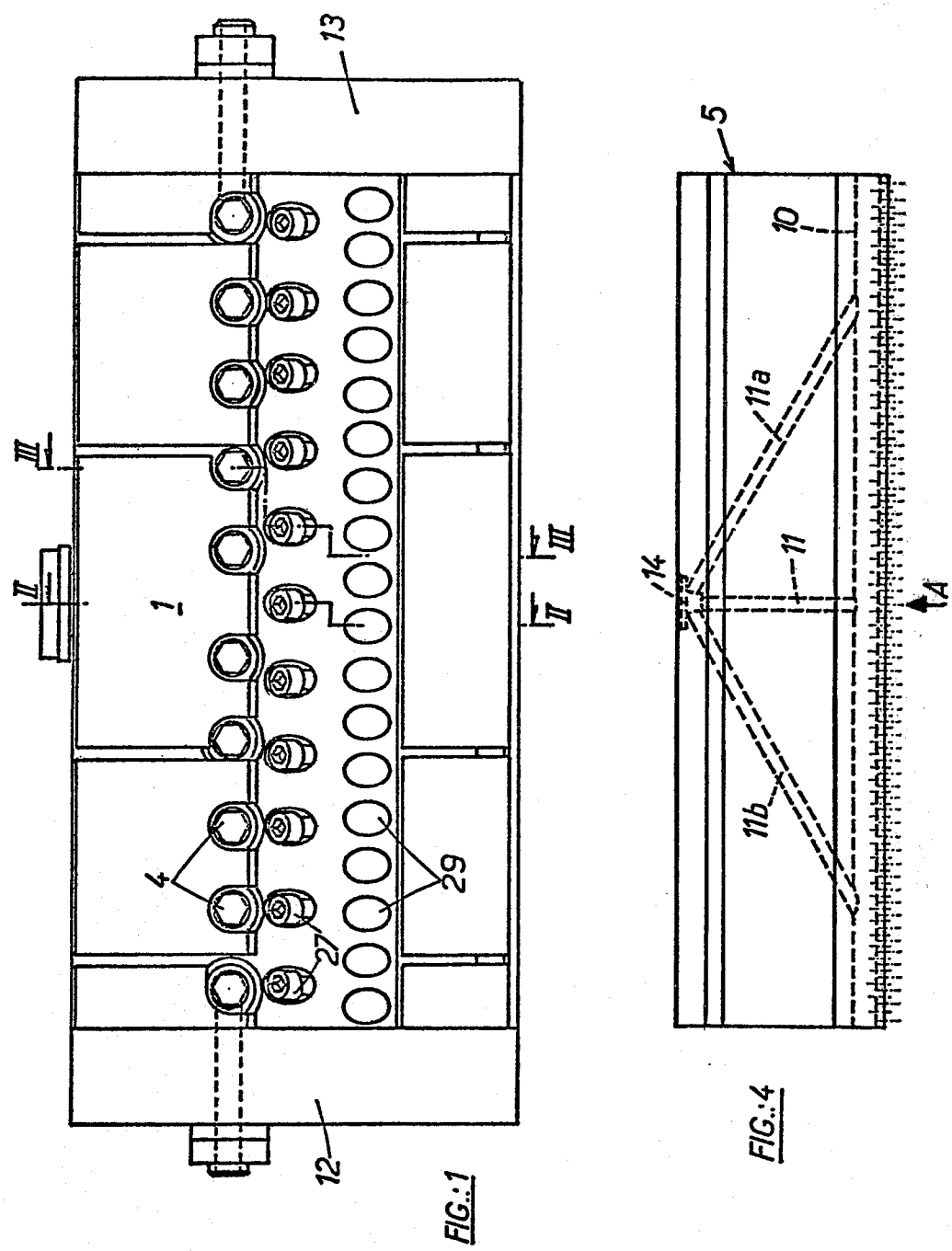

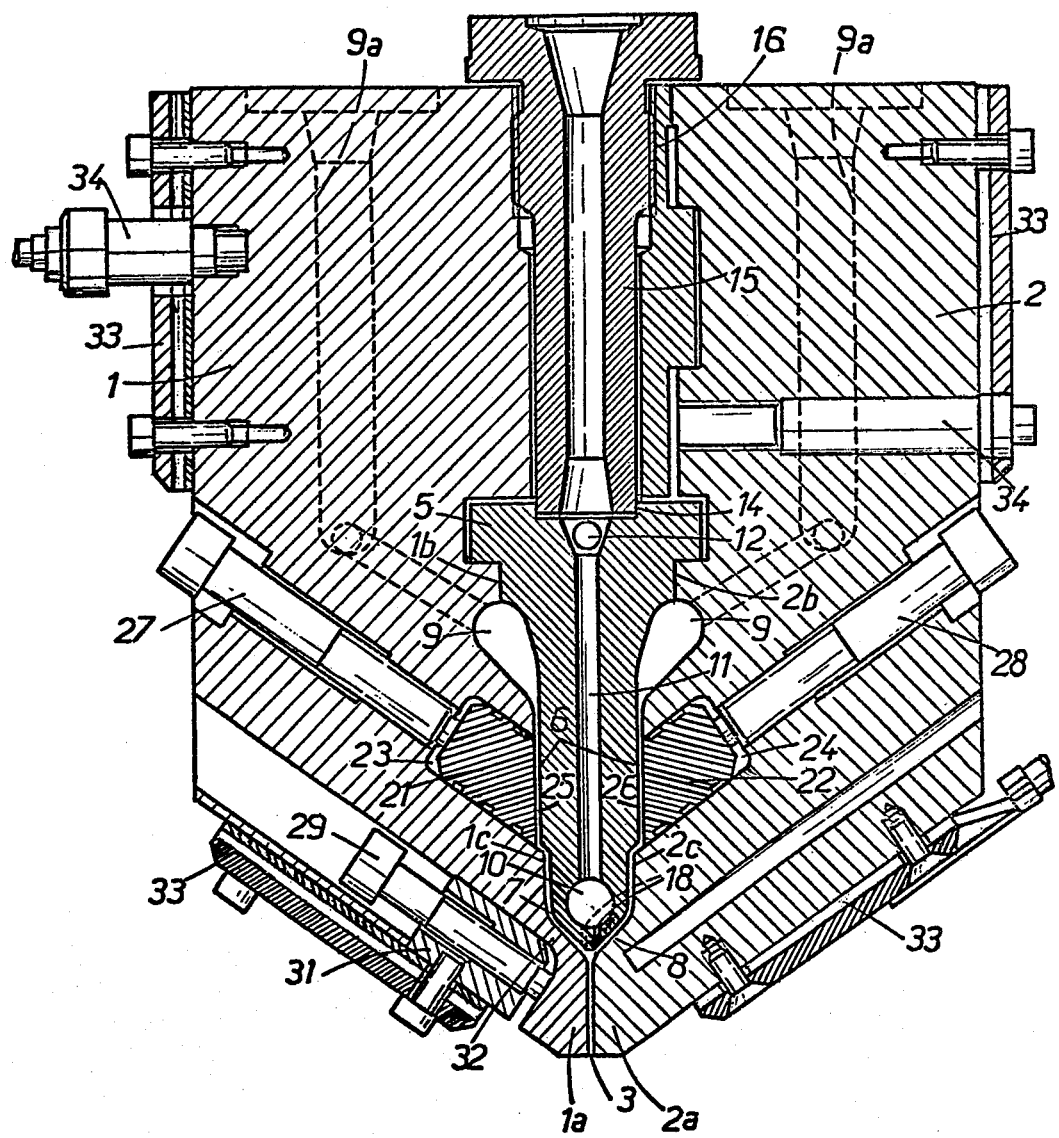
FIG.:2

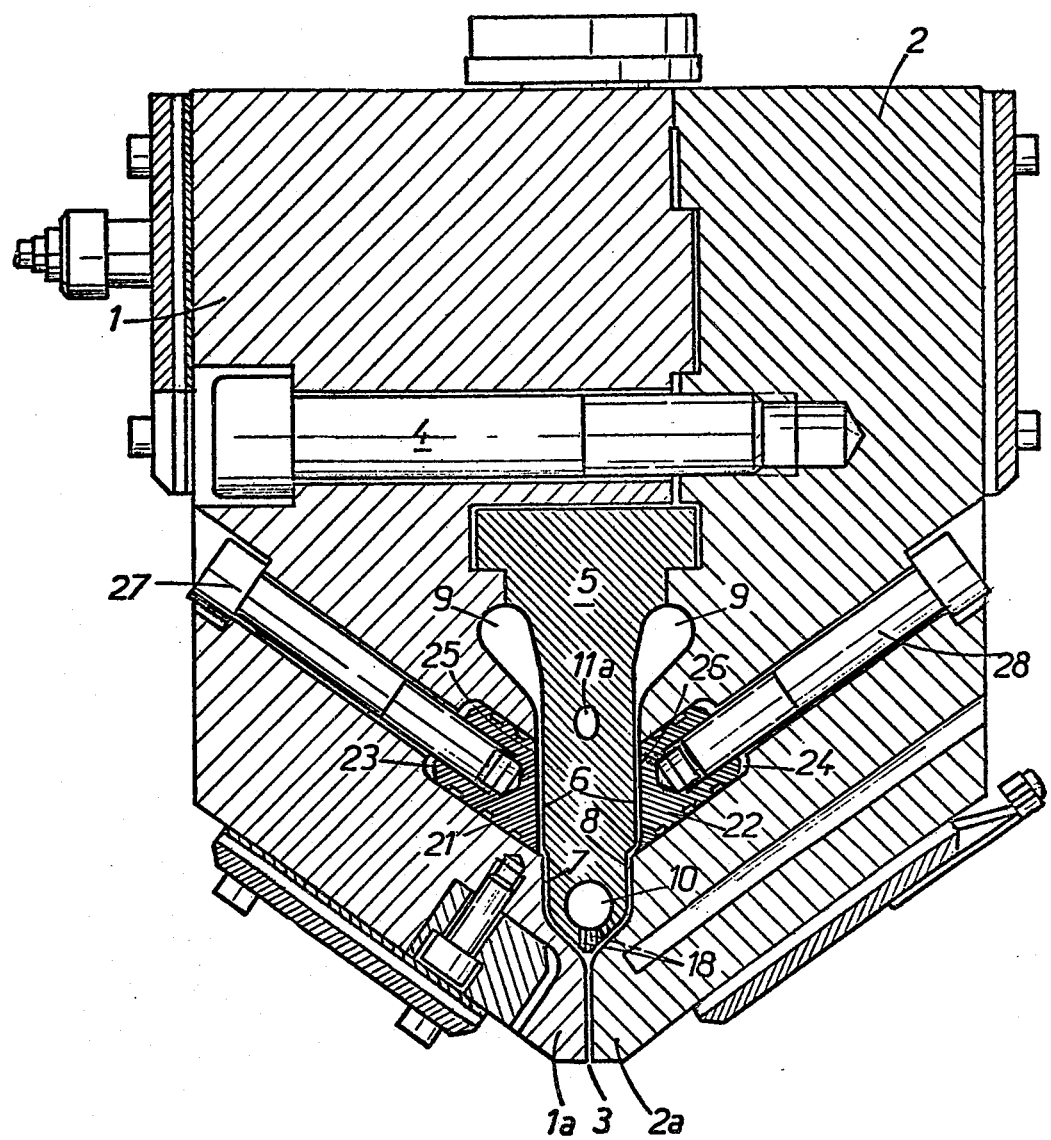
FIG.:3

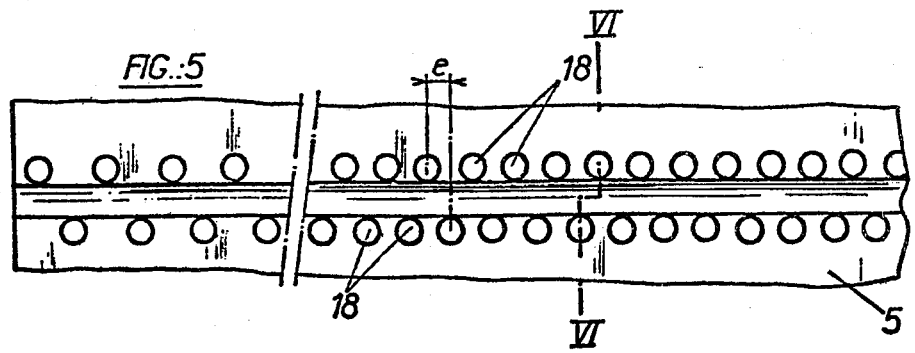
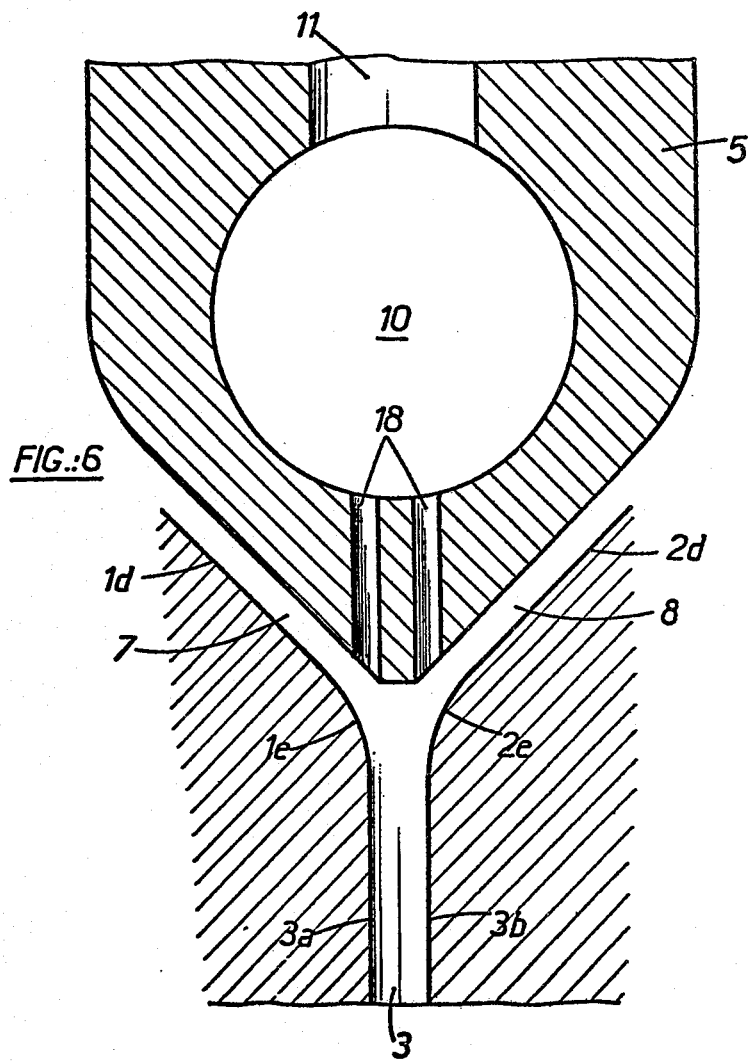

EXTRUSION APPARATUS FOR PRODUCING COMPOSITE STRUCTURES

The invention relates to a die system for extruding at least two molten polymeric materials, said at least two materials being mutually incompatible so as to form films or foils sheathing threads or filaments placed parallel to the lengthwise direction of the film or foil. Such films or foils of composite nature are used in particular for the manufacture of filaments by pressing and fibrillating with transverse stretching, as described in copending U.S. Application Ser. No. 388,124 filed Aug. 13, 1973, now abandoned assigned to the assignee of the present application.

A known die system comprises flat conduits converging toward an extrusion slit to feed polymeric substance(s) required to form the body of a film and a series of orifices placed parallel to one another opposite the slit for the formation of the threads or filaments of another polymeric substance to be sheathed in the film. The latter orifices are hollowed out in the teeth of a comblike contour so that the intervals between the teeth are the passageways for one of the polymeric substances forming the body of the film for sheathng the threads or filaments. It was considered that such an arrangement was necessary to achieve good sheathing of the threads or filaments. It was found, however, that such an arrangement has the disadvantage in that the intervals between the filaments become excessive when there is appreciable tranverse stretching of the film during filament formation.

One of the objects of the present invention is a die system permitting the close crowding together of the filaments in the extruded products, said system being simultaneously of simple and advantageous design.

Another object of the present invention is the achievement of a die element comprising a central section provided with filament-forming orifices with feed-channels for these orifices and two lateral sections so assembled that the lateral sections hold the central section while leaving on either side of it adjustable and calibrated spaces for the passage of a sheating material.

A further object of the present invention is a regulator for the width of the extrusion slit permitting adjustment of that width along several points of the length of the slit.

The description below in conjunction with the attached drawings is provided in non-restrictive manner to permit the implementation of the invention, the particulars inherent in the drawings as well as in the text obviously being part of this invention.

FIG. 1 is a schematic elevation at a reduced scale of a die base in one embodiment of the invention.

FIGS. 2 and 3 are larger-scale sections along II—II and III—III of FIG. 1.

FIG. 4 is at the same scale as FIG. 1 and shows the elevation of the central section of the die, of which the section is shown in the shape of a punch.

FIG. 5 is at a larger scale and shows the central part of the body viewed in the direction of arrow A of FIG. 4.

FIG. 6 is a partial section of this body along line VI—VI.

As shown in the drawings (FIGS. 2 and 3), the improved die comprises a two-part 1,2 body, these two parts being parallel to each other and terminating into two lips 1a,2a separated by a small spacing 3 forming the extrusion slit. These two parts are assembled by any suitable means, for instance by screws 4 (FIG. 3). Parts 1 and 2 hold therebetween a central part 5 which, when shown in cross-section, a T-shaped bar which extends parallel to the aforesaid parts and of which the lower segment has a pointed shape similar to a punch. It will be so termed hereafter. Parts 1 and 2 are tightened against this punch along the stop surfaces 1b,2b; further below, flanks 6 of the punch are apart from inside flanks 1c,2c of parts 1 and 2 by flat spacings 7,8 converging toward the extrusion slit 3. These gaps serve to feed a molten polymeric substance to slit 3 for the purpose of forming the matrix of the film extruded through slit 3. To that end the aforesaid gaps communicate with chambers 9 extending parallel to slit 3 between punch 5 and parts 1,2, said chambers themselves being pressure fed from channel 9a. The latter are drilled into parts 1,2 and issue above the base where they connect into a supply device, not shown in the drawing. A cylindrical chamber 10 extending parallel to the extrusion slit is hollowed out in punch 5 near its lower end and is pressure fed with a molten polymeric material incompatible with the first polymeric material and of which the melting point preferably is higher. The wall of this chamber is drilled with extrusion holes 18, as fully explained hereinafter.

As shown in FIGS. 2 and 4, chamber 10 is fed from three channels 11, 11a, and 11b drilled into the bulk of the punch, the first into its central segment perpendicularly to chamber 10 and the other two obliquely. These three channels issue into a hollow 14 of the punch's upper segment into which is fitted a tube 15 screwed at 16 into the body of the die for the purpose of connecting to the molten polymeric material supply system, not shown in the drawing.

The arrangement of channels 11, 11a and 11b permits the regulation of the polymeric material flow toward chamber 10 and toward its extrusion orifices and permits balancing the load losses. Furthermore, a larger number of channels may be provided if desired.

Two side plates 12,13 (FIG. 1) placed at the ends of segments 1,2 assist in their assembly and terminally close slit 3, gaps 7,8, channels 9, and chamber 10.

Near the end of the punch, the wall of chamber 10 is drilled with small holes 18 through which the molten polymeric substance fed into this chamber may pass toward slit 3 simultaneously with the substance from gaps 7,8. Extruding through these small holes 18 provides threads or filaments which pass through slit 3 and are sheathed in the continuous foil or film issuing from slit 3; and, because the material of the threads is incompatible with that of the foil or film and of higher melting point, the threads experience an initial solidification by which they are stabilized.

Applicants have established that it is desirable to bring the threads or filaments close together so that by means of the ultimate stretching in a ratio as high as 10:1 of the extruded product there will be a gap of only several millimeters between the threads, 5 mm for instance. Holes 18 are, accordingly, drilled into the wall of the channel in two parallel rows and are staggered with respect to each other from one row to the other (FIG. 5). This arrangement allows bringing the holes close together while enough of the wall material of chamber 10 remains. Spacing "e" (FIG. 5) between two holes shaping two adjacent filaments may even be less than the diameter of those holes because the extruded filament diameter itself is less than that of the holes on account of viscosity. Furthermore, the spacings between the axes of the holes may vary along the punch. In particular, it has been found advantageous to increase the spacing between the holes toward the ends of chamber 10. In fact, it was found that the extrusion process of a slot die determines a transverse tapering of the extruded film between the exit from the die and the arrival of this film at the cylinder. The threads tend to approach each other and this phenomenon is more marked at the edges of the film than at its center. Furthermore, when the film is meant to be biaxially oriented, longitudinal stretching again causes a narrowing in width of the film, and this narrowing is more pronounced at the edges, the filaments tending to come together. This appears in the form of a narrower thread or filament spacing at the edges of the film or foil than at the center. In order to remedy this phenomenon, the spacing between holes 18 may be made variable in the applicable zones, so that the spacing (considered parallel to the axis of chamber 10) progressively increases as the ends of the die are approached. The suitable change in spacing can be determined empirically or by computation. Such an array is made easier to drilling the holes in staggered fashion.

It will be observed that the axes of the holes so drilled no longer are in the axial plane of extrusion slit 3, being offset on either side of this plane (FIGS. 5, 6). However, since the holes issue into the spacings 7,8 between the punch and segments 1,2 of the die body and because these spacings in view of the punch's shape converge toward slit 3, the threads issuing from the holes are caught into the material which flows inside these spacings towards the slit and thereby are brought back into latter's plane of symmetry. To facilitate this process, the plane walls 3a,3b of the slit (FIG. 6) are joined to the converging walls 1d,2d of spacings 7,8 by rounded surfaces 1e,2e forming a small chamber preceding the slit above the punch.

Two lengthwise bars or stubs 21,22 extending parallel to the slit are mounted in gliding manner in the longitudinal recesses 23,24 machined in segments 1 and 2 of the die body for the purpose of regulating the cross-section of spacings 7,8, the aforesaid bars terminating next to the punch in surfaces 25,26 which are parallel with those of the punch. Bars 21,22 may be translated by means of screws 27,28 turning in threads in the body of the die and with their ends fastened to said bars as to allow rotation with respect to them, and thereby the passageways for the material may be narrowed more or less on either side of the punch. Thereby, the cross-section of the film issuing from the die may be controlled by modifying the flow rate.

The width of slit 3 also may be regulated by means of screws 29 (FIG. 2) arranged at certain intervals along one of the lips 1a of the die and screwing each into a nut 31 solidly mounted to the die body. Lip 1a being joined to die body 1 by a thinner segment 32, the pressure exerted by screws 29 allows some elastic deformation varying the slit width. By controlling screws 29 from one to the next, the film cross-section may be controlled and improved.

The die body is complemented by heating elements of the electric type which may be placed either against the outside surface of the die body as shown at 33, or else be embedded into the die body, for instance in the manner of cylindrical heating cartridges 34. These heating elements may be placed in groups or zones perpendicular to the plane of the slit and be controlled independently, again allowing to correct the film cross-section by adjusting local temperatures.

It should be noted that the described die system permits the processing of two different external polymeric substances to form the film matrix, since such materials may be supplied separately to chambers 9 feeding the gaps 7,8 upstream of the slit. It suffices that the two materials be mutually compatible to provide bonding between the filaments of the center layer. The arrangement of bars 21,22 allows separate adjustment of the flow rates for the particular substances being used.

Holes 18 drilled into the wall of channel 10 may be a cross-section different than circular if non-circular contour filaments are desired, for instance flattened ones. However, the shape of the threads may also be modified by varying the viscosity of the polymeric material or by effecting the extrusion temperature, for instance by suitably controlling the heater resistances.

Obviously the described embodiments are only examples which may be modified, in particular by substituting equivalent techniques, without thereby departing from the scope of the invention.

We claim:

1. A planar extrusion-die system for achieving a film or foil sheathing network of lengthwise threads or filaments substantially centrally disposed in said film or foil, said system comprising an extrusion slit fed upstream by two flows of polymeric materials, one of which issues from a plurality of flat conduits to form a film or foil and the other from a multitude of small holes drilled into a central component of which the vertical cross-section is in the shape of a punch located in the body of the die upstream of said slit to form threads or filaments, said holes being fashioned in the punch as two parallel rows staggered with respect to holes from one row to the other, said extrusion slit being joined by rounded surfaces to the flat conduits supplying the material forming the film or foil to provide a chamberlike area, said holes issuing immediately upstream of the issuing of said flat conduits into the extrusion slit toward said rounded surfaces and into said chamberlike area, said threads or filaments being engaged by the polymer flow of said flat conduits and brought into a row in the plane of symmetry of said extrusion slit.

2. System as defined in claim 1 characterized in that the spacing between the holes is larger toward the slit ends than at the center.

3. System as defined in claim 1 characterized in that the distance between two adjacent holes is less than their diameter.

4. System as defined in claim 1 characterized in that the holes are fashioned in the wall of a cylindrical chamber drilled into the punch parallel to the slit and supplied by several channels distributed in the punch.

5. System as defined in claim 1 characterized in that the die-body comprises two lateral segments held together and tightening said central component and providing between said segments and said central component flat spacings for the purpose of supplying to the extrusion die the molten material with which to achieve the film matrix.

6. System as defined in claim 5 characterized in that the cross-section of the passageway of said spacings may be adjusted by projecting bars.

7. System as defined in claim 1 characterized in that at least one of the slit walls is perpendicularly elastic to said slit and is associated with pressure devices distributed over its length to allow local adjustment of the slit width.

* * * * *